United States Patent [19]

Puskas et al.

[11] Patent Number: 5,194,538
[45] Date of Patent: Mar. 16, 1993

[54] PREPARATION OF BUTYL RUBBER WITH BIMODAL MOLECULAR WEIGHT DISTRIBUTION

[75] Inventors: Judit E. Puskas; Gabor Kaszas, both of Corunna, Canada

[73] Assignee: Polysar Corporation, Sarnia, Canada

[21] Appl. No.: 914,368

[22] Filed: Jul. 15, 1992

[51] Int. Cl.$^5$ .................. C08F 4/14; C08F 210/12
[52] U.S. Cl. .................. 526/206; 526/91; 526/185; 526/210; 526/237; 526/339
[58] Field of Search .............. 526/91, 210, 185, 237, 526/339, 206

[56] References Cited

U.S. PATENT DOCUMENTS

| | | | |
|---|---|---|---|
| 2,781,334 | 2/1957 | Welch et al. | 525/87 |
| 4,942,210 | 7/1990 | Kuntz | 526/237 X |
| 5,071,913 | 12/1991 | Powers et al. | |

FOREIGN PATENT DOCUMENTS 0341012 11/1989 European Pat. Off. ............ 526/237

Primary Examiner—Fred Teskin
Attorney, Agent, or Firm—Joseph C. Gil; Godfried R. Akorli

[57] ABSTRACT

A polymerization process is provided for producing a butyl rubber with a bimodal molecular weight distribution which comprises introducing isobutylene, a conjugated diolefin monomer having from 4 to 8 carbon atoms, from about $1 \times 10^{-5}$ to about $1 \times 10^{-3}$ moles of an initiator component per mole of isobutylene, said initiator component being selected from the group consisting of an initiator component having the formula:

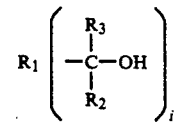

in which $R_1$, $R_2$ and $R_3$ are selected from the group consisting of alkyl, aryl and aralkyl groups and can be the same or different and i is a positive whole number from 2 to 6, and an initiator component having an adamantyl nucleus bearing from 2 to 4 hydroxyl groups an inert organic solvent and from about $1 \times 10^{-4}$ to about $1 \times 10^{-3}$ moles of water per liter of inert organic solvent into a suitable reaction vessel at a temperature of from about $-120°$ C. to about $-50°$ C., adding a solution of from about $5 \times 10^{-5}$ to about $1 \times 10^{-2}$ moles of a Lewis acid per mole of isobutylene in an organic solvent and polymerizing the monomers to form said butyl rubber.

12 Claims, No Drawings

PREPARATION OF BUTYL RUBBER WITH BIMODAL MOLECULAR WEIGHT DISTRIBUTION

FIELD OF THE INVENTION

This invention relates to a process for producing butyl rubbers and, in particular, to a process in which the use of a specific catalyst system enables butyl rubbers having a bimodal molecular weight distribution to be produced.

BACKGROUND OF THE INVENTION

In commercial operations, it has been found that the more processable butyl rubbers possess sufficient green strength to resist excessive flow and deformation in various handling procedures. It is generally believed that green strength is related to molecular weight with green strength improving as the molecular weight increases. However, it is also desirable in certain applications such as the manufacture of tires, that the rubbers have a rapid stress relaxation rate so that the stresses imposed during the manufacturing process relax quickly and the rubber does not slowly change its shape or pull apart due to the undissipated stresses. However, as the stress relaxation rate is also a function of molecular weight with the relaxation rate becoming slower as the molecular weight increases, when the molecular weight is increased to improve green strength, the stress relaxation rate is reduced. Thus, as the butyl rubber becomes better able to resist flow and deformation in various handling procedures, it becomes more prone to change shape or pull apart due to the unrelaxed stresses. Hence, in the manufacture of butyl rubbers, there is a necessity to strike a balance between the higher molecular weight needed to achieve increased green strength and the lower molecular weight required to bring about a reduction in the stress relaxation rate.

Various means have been used for modifying the molecular weight and/or the molecular weight distribution of butyl rubbers. One means described in U.S. Pat. No. 5,071,913 (Exxon) is by blending butyl rubbers and polyisobutylenes of widely differing and defined molecular weights to produce "tailormade" molecular weight distributions. This has resulted in polymers and polymer compositions with the unique combination of green strength levels attributable to higher molecular weight butyl polymers combined with lower viscosity and faster stress relaxation attributable to lower molecular weight butyl polymers.

Another means of modifying the molecular weight and/or the molecular weight distribution of butyl rubbers, also detailed in U.S. Pat. No. 5,071,913, is achieved by introducing selectively and in a controlled manner during the polymerization cationically active branching agents such as polyisoprene, block copolymers of polybutadiene and polystyrene and their partially hydrogenated or hydrohalogenated derivatives. A small amount of a very highly functional and reactive soluble moiety can be used to introduce a small amount of very high molecular weight, highly branched material into the distribution. Conversely, a larger amount of a less reactive, lower functionality moiety can be used to introduce more of a lower molecular weight, branched material into the distribution.

A method by which the cold flow characteristics of butyl rubber can be improved is described in U.S. Pat. No. 2,781,334 and involves the use of minor amounts of divinyl aromatic hydrocarbon compounds in the butyl polymerization process to afford a butyl rubber that is partially crosslinked.

Heretobefore, there has not been described a process for the preparation of butyl rubber wherein the use of a catalyst system comprising an initiator component having a specific molecular structure and a Lewis acid in the polymerization process permits the formation of a butyl rubber having a bimodal molecular weight distribution.

SUMMARY OF THE INVENTION

It is an objective of the present invention to provide a process for the preparation of a butyl rubber having a bimodal molecular weight distribution.

Accordingly, in one of its aspects, the present invention provides a process for the preparation of a butyl rubber having a bimodal molecular weight distribution which comprises the steps:

(A) introducing into a suitable reaction vessel a monomer charge comprising from about 95 to about 99.5 weight percent of isobutylene and from about 5 to about 0.5 weight percent of a conjugated diolefin monomer having from 4 to 8 carbon atoms based or a total of 100 weight percent of said isobutylene and said conjugated diolefin, from about $1 \times 10^{-5}$ to about $1 \times 10^{-3}$ moles of an initiator component per mole of isobutylene, said initiator component being selected from the group consisting of an initiator component having the formula:

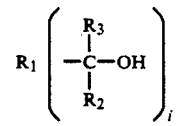

in which $R_1$, $R_2$ and $R_3$ are selected from the group consisting of alkyl, aryl, and aralkyl groups and can be the same or different and i is a positive whole number from 2 to 6 and an initiator component having an adamantyl nucleus bearing from 2 to 4 hydroxyl groups, an inert organic solvent for said monomers and said initiator component and from about $1 \times 10^{-4}$ to about $1 \times 10^{-3}$ moles of water per liter of inert organic solvent, at a temperature of from about $-120°$ C. to about $-50°$ C., (B) adding to the solution of step (A) from about $5 \times 10^{-5}$ to about $1 \times 10^{-2}$ moles of a Lewis acid per mole of isobutylene dissolved in an organic solvent selected from the group consisting of $C_1$ to $C_4$ halogenated hydrocarbons, (C) polymerizing the monomers at a temperature of from about $-120°$ C. to about $-50°$ C. to form said butyl rubber, and (D) recovering the butyl rubber.

For the purposes of this invention, a butyl rubber with a bimodal molecular weight distribution is a butyl rubber that gives rise to a polymer concentration-elution time gel permeation chromatogram that is comprised of two compositional elements.

DETAILED DESCRIPTION OF THE INVENTION

The processes used to prepare butyl rubber are well known in the art. Commercially, butyl rubber is prepared in a low temperature cationic polymerization process using Lewis acid type catalysts of which a typical example is aluminum chloride. The process used most extensively employs methyl chloride as the diluent for the reaction mixture and the polymerization is conducted at temperatures of the order of less than −90° C. Methyl chloride is employed for a number of reasons, one being that it is a solvent for the monomers and aluminum chloride catalyst and a nonsolvent for the polymer product and thus, affords a slurry. Also, methyl chloride has suitable freezing and boiling points that permit, respectively, low temperature polymerization and effective separation of the methyl chloride from the product polymer and unreacted monomers. However, it is also possible to conduct such polymerizations in a diluent which is a solvent for the polymer produced, examples of such diluents being the hydrocarbons pentane, hexane and heptane and mixtures of the aforementioned solvents with one another or with methyl chloride and/or methylene chloride.

It has now been found somewhat surprisingly that the use of an initiator component bearing from two to six tertiary hydroxyl groups together with a Lewis acid as the catalyst system in the polymerization process enables a butyl rubber with a bimodal molecular weight distribution and thus a more processable butyl rubber to be produced.

The monomer charge suitable for use in the process of the present invention comprises from about 95 to about 99.5 weight percent of isobutylene and from about 5 to about 0.5 weight percent of a conjugated diolefin monomer having from 4 to 8 carbon atoms based on a total of 100 weight percent of said isobutylene and said conjugated diolefin monomer. Preferably, the monomer charge comprises from about 97 to about 99.5 weight percent of isobutylene and from about 3 to about 0.5 weight percent of a conjugated diolefin monomer having from 4 to 8 carbon atoms based on a total of 100 weight percent of the monomers. Isoprene is the conjugated diolefin of preference.

The initiator component suitable for use in the process disclosed herein is selected from the group consisting of an initiator component having the formula:

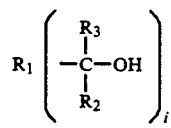

in which $R_1$, $R_2$ and $R_3$ are selected from the group consisting of alkyl, aryl and aralkyl and can be the same or different and i is a positive whole number from 2 to 6 and an initiator component having an adamantyl nucleus bearing from 2 to 4 hydroxyl groups.

Illustrative non-limiting examples of suitable initiator components include 1,4-dihydroxy-1,1,4,4-tetraphenylbutane, 2,5-dihydroxy-2,5-dimethyl hexane, 2,5-dihydroxy-hex-3-ene, 2,5-dihydroxy-2,5-dimethyl-hex-3-ene, 2,5-dihydroxy-2,5-dimethyl-hex-3-yne, 2,6-dihydroxy-2,4,4,6-tetramethylheptane, 4,4′,4″-tri[(2-hydroxy-2-propyl)phenyl] methane, 1,4-di(2-hydroxy-2-propyl) benzene (dicumyl alcohol), 1,3,5-tri(2-hydroxy-2-propyl) benzene (tricumyl alcohol), 1,3,5-trihydroxyadamantane and 1,3,5,7-tetrahydroxyadamantane. Preferably the initiator component is selected from the group consisting of 1,4-di(2-hydroxy-2-propyl)benzene and 1,3,5-tri(2-hydroxy-2-propyl)benzene, the most preferred initiator component being 1,3,5-tri(2-hydroxy-2-propyl)benzene.

The amount of the initiator component used relative to the amount of the isobutylene is important for obtaining a butyl rubber with a bimodal molecular weight distribution and is from about $1\times10^{-5}$ to about $1\times10^{-3}$ moles per mole of isobutylene.

A number of Lewis acids are suitable for use in the process disclosed herein. Non-limiting examples include boron trichloride, boron trifluoride, aluminum trichloride, titanium tetrachloride and ethyl aluminum dichloride with the preferred Lewis acid for use in this invention being aluminum trichloride. The amount of the Lewis acid used relative to the amount of isobutylene is from about $5\times10^{-5}$ to about $1\times10^{-2}$ moles per mole of isobutylene.

In the process of this invention, the Lewis acid is employed as a solution in a low-freezing non-complex forming solvent selected from the group consisting of $C_1$ to $C_4$ halogenated hydrocarbons. Preferably, the solvent is selected from one of methylene chloride and methyl chloride.

The inert organic solvents suitable for use in the commercial butyl rubber polymerizations mentioned previously are also suitable for use as a solvent for the monomer charge and the initiator component in the process of the present invention. Preferred inert organic solvents include $C_1$ to $C_4$ halogenated hydrocarbons and mixtures thereof, $C_5$ to $C_8$ aliphatic hydrocarbons, $C_5$ to $C_{10}$ cyclic hydrocarbons, mixtures of one or more said halogenated hydrocarbons and one or more of said aliphatic hydrocarbons and mixtures of one or more of said halogenated hydrocarbons and one or more of said cyclic hydrocarbons. Most preferably the inert organic solvent is selected from the group consisting of methyl chloride, methylene chloride and mixtures thereof.

In order that the process of the present invention afford a butyl rubber with a bimodal molecular weight distribution, it is important that the inert organic solvent in which the monomer charge and initiator component are dissolved contain trace amounts of water of the order of about $1\times10^{-4}$ to about $1\times10^{-3}$ moles of water per liter of inert organic solvent. As the majority of inert organic solvents supplied commercially contain trace amounts of water, it has been found that when the process of the present invention is carried out on the laboratory scale there is no need to add additional water to the reaction medium. However, when the process of the present invention is carried out on a commercial scale, the nature of the reaction is such that the water required in the process has to be added in addition to the inert organic solvent. It is important for the practice of the present invention that the total hydroxyl group concentration, that is the concentration of the hydroxyl groups on the initiator component and the concentration of the water hydroxyl group, is less than the concentration of the Lewis acid. For when the total concentration of the hydroxyl groups is equal to or greater than the concentration of the Lewis acid, a monomodal butyl rubber is produced by the polymerization process.

The order of addition of the monomer charge, the initiator component, the Lewis acid and the solvent containing the trace amount of water is critical to the production of a butyl rubber having a bimodal molecular weight distribution. A suitable reaction vessel is first charged with the isobutylene and a conjugated diolefin monomer, the initiator component and the solvent containing a trace amount of water at a temperature of from about −120° C. to about −50° C. This is then followed by the addition of the solution of the Lewis acid in a halogenated hydrocarbon solvent to initiate the polymerization of the isobutylene and the conjugated diolefin. The monomers are polymerized at a temperature of from about −120° C. to about −50° C. to form the product butyl rubber with a bimodal molecular weight distribution; the rubber subsequently being recovered. It has been found that if the reactants are not added in the aforedescribed order but instead the initiator component and the solution of the Lewis acid in the halogenated hydrocarbon solvent are premixed prior to the addition of the monomer charge and the solvent containing trace amounts of water, the resultant butyl rubber does not exhibit a bimodal molecular weight distribution.

The butyl rubber produced according to the process disclosed herein may be recovered by conventional techniques used to recover rubbery polymers. Such techniques include for the higher molecular weight polymers, contacting the polymer-solvent solution or slurry with copious amounts of hot water thereby flashing off the solvent and any unreacted monomer. The polymer-hot water slurry may then be passed through a tunnel dryer or drying extruder. In another technique, especially for polymers having a number average molecular weight of less than 30,000, the polymer is recovered by (i) contacting the polymer-solution or slurry with steam or by applying a vacuum to the polymer solution or slurry to flash off the solvent and any unreacted monomer, (ii) extracting acidic impurities and any remaining high boiling solvents with methanol, and (iii) drying the purified polymer to remove traces of methanol.

While not wishing to be bound by any theory, we believe that the initiator component, tricumyl alcohol, by way of illustration, which carries three tertiary hydroxy groups provides centres from which the polymer may grow in addition to those produced in the reaction of the Lewis acid, aluminum chloride, and the trace amounts of water in the reaction medium, the gegenion in both cases being the relatively stable $AlCl_3OH^-$.

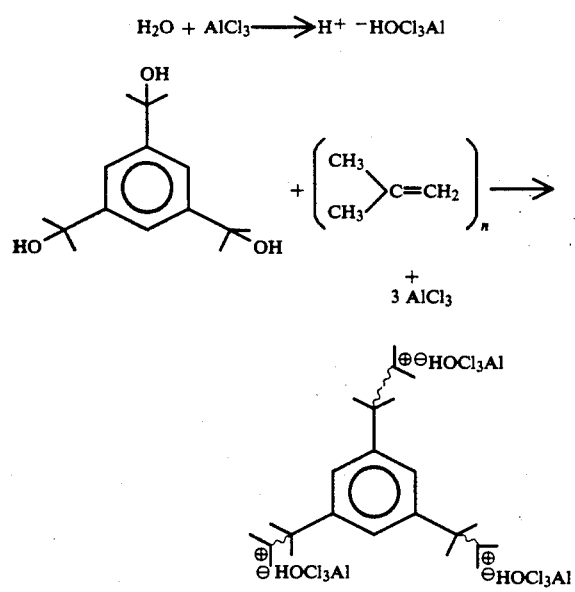

Thus, a linear polymer and a branded polymer will grow from the protic centre and the three centres originating from the tricumyl alcohol respectively during the polymerization thereby giving rise to a butyl rubber with a bimodal molecular weight distribution.

The following examples illustrate the present invention and are not intended to limit the scope thereof.

Materials

Isobutylene and methyl chloride were used as received from Matheson. Isoprene from which the inhibitors had been removed, was distilled from calcium hydride under a nitrogen blanket prior to use. Aluminum trichloride was used as received from Aldrich. The composition was checked by hydrolysing known amounts and determining the aluminum content by atomic absorption. 1,4-Di(2-hydroxy-2-propyl) benzene was used as received from Aldrich.

The initiator 1,3,5-tri(2-hydroxy-2-propyl) benzene (tricumyl alcohol) was synthesized in the following manner.

1,3,5-Tricarboxybenzene (300.0 g, 1.43 mol) was dissolved in methanol (5000 mL) in a three-necked flask equipped with an overhead stirrer and a reflux condenser under a nitrogen blanket and concentrated sulphuric acid (25 mL) was then added. The solution was heated under reflux with stirring for 48 hours during which time dimethoxypropane (530 mL) was added in three portions; 200 mL at 6 hours, 200 mL at 24 hours and 130 mL at 44 hours. Upon cooling, tricumyl methyl ester crystals separated out of the solution and they were filtered off, washed with distilled water followed by cold methanol and dried in a vacuum oven at a temperature of 40° C.

A solution of methylmagnesium bromide in diethyl ether (800 mL, 2.4 mol) was transferred to tetrahydrofuran (1000 mL) under a nitrogen blanket in a three-necked flask equipped with a thermometer, an overhead stirrer and a reflux condenser. To this solution was added dropwise a solution of tricumyl methyl ester (50.4 g, 0.2 mol) in tetrahydrofuran (500 mL) over a period of 2 to 4 hours, care being taken to ensure that the temperature did not rise so that the solution began to reflux. The solution was stirred overnight during which time it thickened to a paste. The paste was poured on to ice and the organic layer was then separated and concentrated under reduced pressure. This concentrate was extracted with an equal volume of hexane in order to remove some of the impurities, separated from the hexane layer and further concentrated under reduced pressure. The residual product was dissolved in warm ethyl acetate, the insoluble magnesium salts filtered off and the tricumyl alcohol crystals allowed to crystallize from the solution under refrigeration. The tricumyl alcohol crystals were filtered off and dried in a vacuum oven at 40° C. (melting point 144° C.).

EXAMPLE 1

Three dry box batch polymerizations were carried out to show the effect that the use of a catalyst system comprising an initiator component bearing at least two tertiary hydroxyl functionalities and the Lewis acid aluminium chloride, has on the molecular weight distribution of butyl rubber polymerized in methyl chloride diluent.

In a dry box under a nitrogen blanket a reactor equipped with an overhead stirrer and a thermocouple was charged with isobutylene (60.0 g, 1.07 mol), isoprene (1.6 g, 0.023 mol), 1,4-di(2-hydroxy-2-propyl) benzene (dicumyl alcohol) (0.015 g, 7.7×10⁻⁵ mol) and methyl chloride (138.4 g, 150 mL at −90° C.) containing a trace amount of water at a temperature of −90° C. A solution of aluminum chloride (0.032 g, 2.4×10⁻⁴ mol) in methyl chloride (5 mL at a temperature of −90° C.) was then added to the reaction mixture to initiate the polymerization. The rate of the reaction appeared to be very rapid, a large amount of polymer which restricted the movement of the impeller of the overhead stirrer, being formed within a few minutes. The reaction was then terminated by the addition of ethanol. The product polymer was dissolved in hexane and recoagulated by the addition of ethanol containing 1 part of the antioxidant Irganox 1010 (tradename) per 100 parts of polymer.

A second polymerization was carried out in the same manner as detailed above with the exception that 1,3,5-tri(2-hydroxy-2-propyl) benzene (tricumyl alcohol) 0.019 g, 7.5×10⁻⁵ mol) was used as the initiator component in the polymerization.

A third polymerization (the control) wa carried out in the same manner as detailed above with the exception that no initiator component was used in the polymerization.

The molecular weight distributions of the product polymers were determined using a Waters gel permeation chromatographic instrument equipped with six Ultrastyragel® columns connected in series having pore sizes of 100, 500, 10³, 10⁴, 10⁵ and 10⁶ Angstrom respectively maintained at a temperature of 35° C. and two detectors, a differential refractive index detector 410 and a ultraviolet spectrophotometer 484. Tetrahydrofuran was used as the mobile phase at a flow rate of 1 mL per minute. The instrument was calibrated with polystyrene standards having a narrow molecular weight distribution and sulphur was used as the internal reference. Both the weight average molecular weight and the number average molecular weight were calculated using Water's Maxima 820 gel permeation chromatographic software and the universal calibration principle. The validity of the universal calibration principle was verified by calibration with narrow molecular weight distribution polyisobutylene.

The unsaturation in the product polymers was determined by both 200 MH₂ and 500 MH₂ ¹H nuclear magnetic spectroscopy.

The results of the three separate experiments are given in Table I.

From the results in Table I it can be seen that the introduction of an initiator component, either dicumyl alcohol or tricumyl alcohol, into the butyl polymerization process results in the formation of butyl rubbers having a similar degree of unsaturation to the butyl rubber produced in the absence of an initiator component. However, the butyl rubbers produced by the process in which an initiator component is present have a much broader molecular weight distribution that is bimodal in character whereas the butyl rubber produced in the absence of an initiator component has a monomodal molecular weight distribution.

EXAMPLE 2

Two dry box batch polymerizations were carried out to show the effect that the premixing of the initiator component and the Lewis acid has on the molecular weight distribution of butyl rubber polymerized in methyl chloride diluent.

TABLE I

| EXPERIMENT | POLYMER (CONV. %) | $M_n \times 10^{-3}$ | $M_w \times 10^{-3}$ | MODALITY | UNSATURATION - mol % | | |
|---|---|---|---|---|---|---|---|
| | | | | | 200 MH$_z$ | (¹H NMR) | 500 MH$_z$ |
| 1[a] | 49.0 (80) | 70 | 350 | Bimodal | 1.0 | | 1.31 |
| 2[b] | 44.8 (73) | 78 | 370 | Bimodal | 1.0 | | 1.25 |
| 3[c] | 25.3 (40) | 277 | 690 | Monomodal | 1.0 | | 1.21 |

[a]Initiator - dicumyl alcohol
[b]Initiator - tricumyl alcohol
[c]No initiator - control In a dry box under a nitrogen blanket a reactor equipped with an overhead stirrer and a thermocouple was charged with 1,4-di(2-hydroxy-2-propyl) benzene (dicumyl alcohol) (0.015 g, 7.7×10⁻⁵ mol) and a solution of aluminum chloride (0.0275 g, 2.1×10⁻⁴ mol) in methyl chloride (20 mL) at a temperature of −90° C. After 5 minutes, the reactor was further charged with isobutylene (60.0 g, 1.07 mol), isoprene (1.6 g, 0.023 mol) and methyl chloride (138.4 g, 150 mL at −90° C.) containing 7.5×10⁻⁵ moles of water at a temperature of −90° C. and polymerisation immediately began to occur. The reaction was terminated after 5 minutes by theaddition of ethanol. The product polymer was dissolved in hexane and recoagulated by the addition of ethanol containing 1 part of the antioxidant Irganox (tradename) 1010 per 100 parts of polymer.

A second polymerization was carried out in the same manner except the 1,3,5-tri(2-hydroxy-2-propyl) benzene (tricumyl alcohol) (0.015 g, 5.9×10⁻⁵ mol) was used as the initiator component in the polymerization.

The polymers were analyzed as described in Example 1. The results of the two separate experiments are given in Table II.

TABLE II

| EXPER-IMENT | POLY-MER | (CONV %) | $M_n \times 10^{-3}$ | $M_w \times 10^{-3}$ | MODALITY |
|---|---|---|---|---|---|
| 4[a] | 34.4 | 55 | 96 | 242 | monomodal |
| 5[b] | 31.6 | 51 | 203 | 487 | monomodal |

[a]Initiator - dicumyl alcohol
[b]Initiator - tricumyl alcohol

From the results shown in Table II, it can be seen that the premixing of the Lewis acid, aluminum trichloride, and the initiator component prior to the charging of the monomers to be polymerized, results in the formation of butyl rubbers having a monomodal molecular weight distribution.

What is claimed is:

1. A process for the preparation of a butyl rubber having a bimodal molecular weight distribution which comprises the steps:
   (a) introducing into a suitable reaction vessel a monomer charge comprising from about 95 to about 99.5 weight percent of isobutylene and from about 5 to about 0.5 weight percent of a conjugated diolefin monomer having from 4 to 8 carbon atoms based on a total of 100 weight percent of said isobutylene and conjugated diolefin, from about 1×10⁻⁵ to about $1 \times 10^{-3}$ moles of an initiator component per mole of isobutylene, said initiator component selected from the group consisting of an initiator component having the formula:

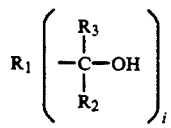

$$R_1 \left( \begin{array}{c} R_3 \\ | \\ -C-OH \\ | \\ R_2 \end{array} \right)_i$$

in which $R_1$, $R_2$ and $R_3$ are selected from the group consisting of alkyl, aryl and aralkyl groups and can be the same or different and i is a positive whole number from 2 to 6 and an initiator component having an adamantyl nucleus bearing from 2 to 4 hydroxyl groups, an inert organic solvent for said monomers and said initiator component and from about $1 \times 10^{-4}$ to about $1 \times 10^{-3}$ moles of water per liter of inert organic solvent, at a temperature of from about $-120°$ C. to about $-50°$ C., (B) adding to the solution of step (A) from about $5 \times 10^{-5}$ to about $1 \times 10^2$ moles of a Lewis acid per mole of isobutylene in an organic solvent selected from the group consisting of $C_1$ to $C_4$ halogenated hydrocarbons, (C) polymerizing the monomers at a temperature of from about $-120°$ C. to about $-50°$ C. to form said butyl rubber, and (D) recovering the butyl rubber.

2. The process of claim 1 wherein said initiator component is selected from the group consisting of
1,4-dihydroxy-1,1,4,4-tetraphenylbutane,
2,5-dihydroxy-2, 5-dimethylhexane, 2,5-dihydroxy-hex-3-ene, 2,5-dihydroxy-2,5-dimethyl-hex-3-ene,
2,5-dihydroxy-2, 5-dimethyl-hex-3-yne,
2,6-dihydroxy-2, 4,4,6-tetramethylheptane,
4,4',4''-tri[(2-hydroxy-2-propyl)phenyl] benzene,
1,4-di(2-hydroxy-2-propyl) benzene
1,3,5-tri(2-hydroxy-2-propyl)benzene,
1,3,5-trihydroxyadamantane and
1,3,5,7-tetrahydroxyadamantane.

3. The process of claim 2 wherein said initiator component is selected from the group consisting of 1,4-di(2-hydroxy-2-propyl) benzene and 1,3,5-tri(2-hydroxy-2-propyl) benzene.

4. The process of claim 3 wherein said initiator component is 1,3,5-tri(2-hydroxy-2-propyl) benzene.

5. The process of claim 1 wherein said monomer charge comprises from about 97 to about 99.5 weight percent of isobutylene and from about 3 to about 0.5 weight percent of a conjugated diolefin monomer having from 4 to 8 carbon atoms based on a total of 100 weight percent of said isobutylene and conjugated diolefin.

6. The process of claim 1 wherein said conjugated diolefin monomer is isoprene.

7. The process of claim 1 wherein the Lewis acid is selected from the group consisting of boron trichloride, boron trifluoride, aluminum trichloride and ethyl aluminum chloride.

8. The process of claim 7 wherein the Lewis acid is aluminum trichloride.

9. The process of claim 1 wherein the inert organic solvent of step (A) is selected from the group consisting of $C_1$ to $C_4$ halogenated hydrocarbons and mixtures thereof, $C_5$ to $C_8$ aliphatic hydrocarbons, $C_5$ to $C_{10}$ cyclic hydrocarbons, mixtures of one or more of said halogenated hydrocarbons and one or more of said aliphatic hydrocarbons and mixtures of one or more said halogenated hydrocarbons and one or more of said cyclic hydrocarbons.

10. The process of claim 9 wherein the inert organic solvent is selected from methyl chloride, methylene chloride and mixtures thereof.

11. The process of claim 1 wherein the organic solvent of step (B) is methyl chloride.

12. The process of claim 1 which comprises the steps:

(A) introducing into a suitable reaction vessel a monomer charge comprising about 95 to about 99.5 weight percent of isobutylene and from about 5 to about 0.5 weight percent of isoprene based on a total of 100 weight percent of said isobutylene and isoprene, from about $1 \times 10^{-5}$ to about $1 \times 10^{-3}$ moles of 1,3,5-tri(2-hydroxy-2-propyl) benzene per mole of isobutylene, methyl chloride as a solvent for said monomers and from about $1 \times 10^{-4}$ to about $1 \times 10^{-3}$ moles of water per liter of methyl chloride, at a temperature of from about $-120°$ to about $-50°$ C., (B) adding to the solution of step (A) from about $5 \times 10^{-5}$ to about $1 \times 10^{-2}$ moles of aluminum chloride per mole of isobutylene in methyl chloride solvent, (C) polymerizing the monomers at a temperature of from about $-120°$ C. to about $-50°$ C. to form said butyl rubber, and (D) recovering the butyl rubber.

* * * * *